No. 720,229. PATENTED FEB. 10, 1903.
W. C. COURTS.
SMOKE CONSUMING APPARATUS FOR FURNACES.
APPLICATION FILED NOV. 4, 1902.
NO MODEL. 2 SHEETS—SHEET 1.

Witnesses
Anna R. McCole
Margaret Lunette

Inventor
W. C. Courts
By his Attorney
Edward P. Thompson

No. 720,229. PATENTED FEB. 10, 1903.
W. C. COURTS.
SMOKE CONSUMING APPARATUS FOR FURNACES.
APPLICATION FILED NOV. 4, 1902.
NO MODEL. 2 SHEETS—SHEET 2.
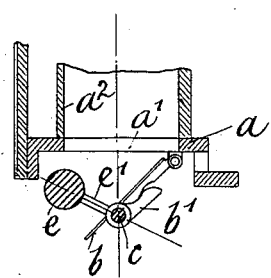
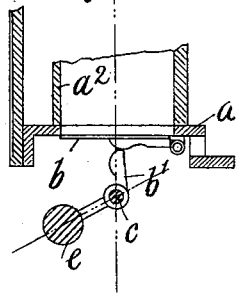
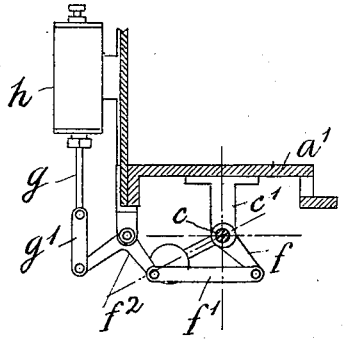
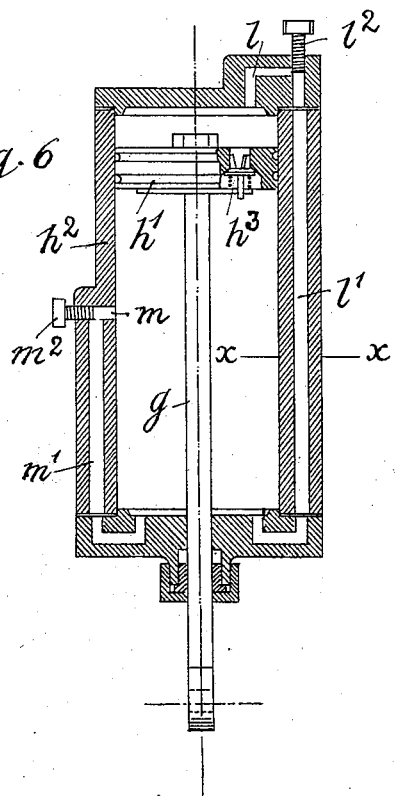
Witnesses
Anna R. McCole
Margaret Smith
Inventor
W. C. Courts
By his Attorney
Edward P. Thompson

United States Patent Office.

WILLIAM CHARLES COURTS, OF MANCHESTER, ENGLAND.

SMOKE-CONSUMING APPARATUS FOR FURNACES.

SPECIFICATION forming part of Letters Patent No. 720,229, dated February 10, 1903.

Application filed November 4, 1902. Serial No. 130,057. (No model.)

*To all whom it may concern:*

Be it known that I, WILLIAM CHARLES COURTS, a subject of the King of Great Britain, and a resident of Manchester, in the county of Lancaster, England, have invented new and useful Improvements in Smoke-Consuming Apparatus for Furnaces, of which the following is a specification.

This invention relates to the kind of apparatus for consuming the smoke of boiler-furnaces in which air-inlets at the furnace-front or the dead-plate are opened by the opening of the fire-door and closed by the action of a weight or spring controlled by a cataract; and the invention consists in the hereinafter-described improvements in such apparatus whereby the air-inlets can be kept fully open for any desired period of time and then gradually closed during any further desired period. For the purpose of keeping the air-inlets fully open for some time before starting to close them instead of starting the closing at once, as with the apparatus of this kind hitherto made, I arrange the mechanism for opening and closing the valves or slides for the air-inlets in such a manner that when the door is opened the said mechanism releases the valves or slides and allows them to open fully by the action of their own weights or of an additional weight or spring while the door is only partly opened and then to rest in that position while the door is further opened and draws the closing organs of the mechanism farther away from the slides or valves, so that when the door is closed again and the said mechanism is returned to its closing position by a weight or spring its closing organs have to make first an idle stroke before encountering the valves or slides and closing them, and I so arrange the cataract that the time during which this idle stroke is performed can be regulated independently of the time during which the closure is effected.

The valves or slides and the mechanism for operating them may be variously arranged to carry the above succession of operations into effect, the arrangement shown on the drawings annexed hereunto being only an example showing how the invention may be carried out.

Figure 1:
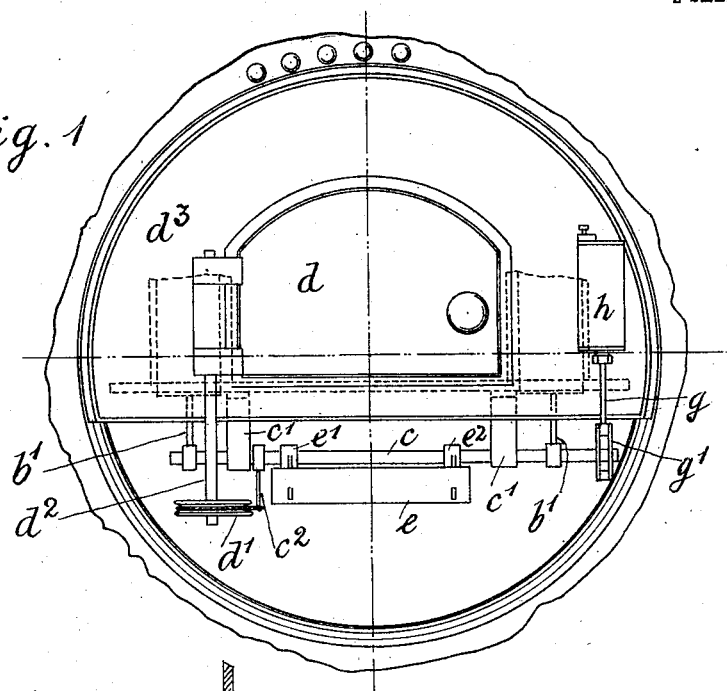
Figure 2:
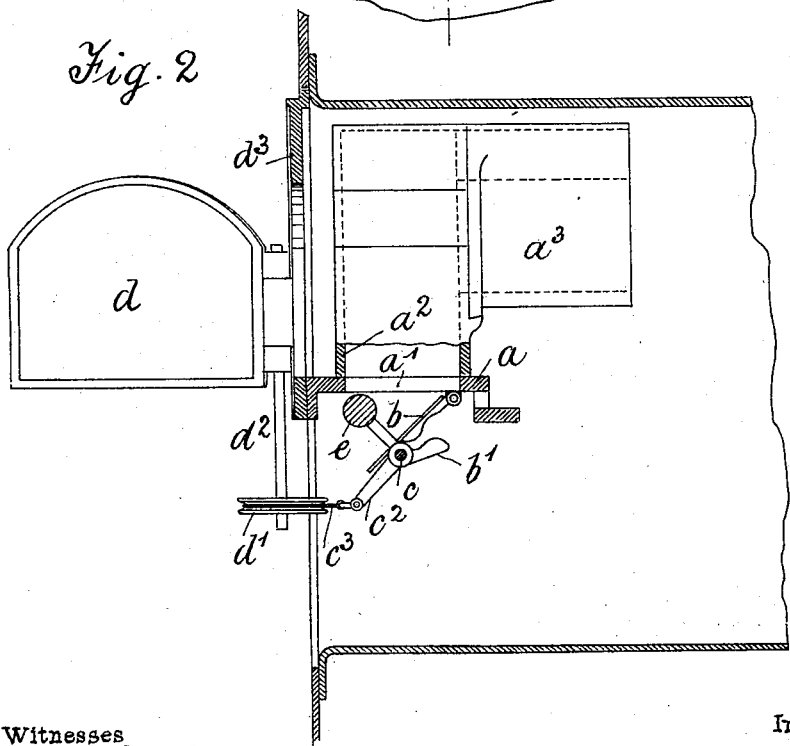

On the annexed drawings, Figure 1 shows a front view of the furnace-front with the air-regulating mechanism applied thereto and with the door and air-inlets closed. Fig. 2 shows a longitudinal section of the same with the door and inlets opened; Fig. 3, a section showing the position of the parts when the closing of the inlets commences, and Fig. 4 the same with the inlets closed. Fig. 5 shows the connection of the operating-shaft and the cataract; Fig. 6, a vertical section of the cataract.

In the apparatus shown air is admitted to the furnace through openings $a'$ in the dead-plate $a$, hollow side frames $a^2$, and projecting nozzles $a^3$. The openings $a'$ are provided with hinged flap-valves $b$. Below the dead-plate a shaft $c$ is supported by brackets $c'$, fixed to the dead-plate. Upon this shaft a lever $c^2$ is fixed, the end of which is connected by a cord or chain $c^3$ to a pulley $d'$, fixed upon the door-spindle $d^2$, the other end of the cord or chain being attached to the pulley. The spindle $d^2$ is fixed in the hinges of the door $d$, so as to turn with it. Two other levers $e'$ $e^2$ are fixed on the shaft $c$ and carry at their outer ends the weight $e$. Opposite each flap-valve $b$ a cam-shaped lever or wiper $b'$ is fixed on the shaft $c$, and the flap-valves are formed with ribs adapted to be acted upon by this wiper. Finally there is another lever $f$, Fig. 5, fixed on the shaft $c$, connected by a link $f'$ to a bell-crank lever $f^2$, which is mounted on a bracket $f^3$ and connected at its other end by a link $g'$ to the piston-rod $g$ of the cataract $h$, which is fixed to the door-frame or furnace-front $d^3$. The action of these arrangements is as follows: When the door is closed and the air-supply shut off, the parts are in the positions shown on Figs. 1, 4, and 5, the wipers $b'$ holding the flap-valves $b$ closed. When the door $d$ is opened to put fresh fuel upon the grate, the door-spindle $d^2$ and pulley $d'$ are turned with the door and the cord or chain $c^3$ wound onto the pulley. The lever $c^2$ is hereby pulled forward and the shaft $c$ and parts attached to it brought into the position shown on Fig. 2, the weight $e$ being lifted up and also the piston-rod and piston of the cataract $h$. After the flaps $b$ have dropped down to open the air-inlets $a^2$ they are arrested by suitable stops—for instance, by resting on the bosses of the wipers $b'$. The diameter of the pulley $d'$, however, is such that the shaft $c$ is turned farther and the wipers $b'$ removed from the ribs on the flap-valves $b$, as shown on Fig. 2, when the door is fully opened. When the door is now closed again, the cord $c^3$ cannot turn the shaft $c$; but the latter is turned forward by the weight $e$, the motion being retarded by the cataract. The flap-valves $b$ remain fully open until the wipers $b'$ come against them in the position shown on Fig. 3 and then are gradually closed by the wipers as the shaft $c$ returns to the position shown on Figs. 1, 4, and 5. By these arrangements the flaps $b$ are kept fully opened after fresh fuel has been put upon the grate, while the shaft is turned from the position Fig. 2 to that shown by Fig. 3, so that during this time the full supply of air that can pass through the openings $a'$ and nozzles $a^3$ is delivered above the fuel, as should be the case till the fire has become nearly bright and no longer smokes to any great extent. After this the air-supply is gradually diminished until the openings $a'$ are closed by the valves $b$. In order to keep the valves fully opened as long as may be required, the cataract $h$ is so arranged that the first part of the movement of its piston while the wipers $b'$ move from the position shown on Fig. 2 to that shown on Fig. 3 can be retarded as much as desired, and the second part of the movement of the piston, during which the valves are closed, can be performed at the same speed or at any desired greater speed. For this purpose the cataract is arranged as shown on Fig. 6. The piston-rod $g$ of the piston $h'$ being connected by the links $g' f'$ and the bell-crank $f^2$ to the lever $f$ on shaft $c$, as above described, the opening of the door causes the piston $h'$ to be pushed to the top of the cylinder $h^2$, a valve $h^3$ in the piston allowing the oil to pass easily from the upper to the under side of the piston, as usual. From the top of the cylinder a passage or port $l\ l'$ leads to the bottom and can be more or less closed by a screw $l^2$. As the weight $e$ turns the shaft $c$ the piston is pulled downward, and the oil has to pass through the port $l\ l'$ from the under side of the piston to its upper side. By closing the port $l$ more or less by the screw $l^2$ the hydraulic resistance to this movement and the time required by the piston to perform the first part of its stroke can be regulated as desired. Another passage or port $m\ m'$, which can be more or less closed by the screw $m^2$, is arranged on the cylinder $h^2$ in such a position that the port $m$ becomes uncovered by the descent of the piston when the shaft $c$ has reached the position Fig. 3. The oil can then pass from the under side to the top side through this port also unless it is closed by the screw $m^2$. In the latter case the piston will continue to move at the same speed as before, and the flap-valves $b$ will be closed slowly, while by opening the port more or less the piston will descend more rapidly and the flap-valves be closed more quickly, as is usually preferable in order to obtain the best results from the fuel. The port $l'$, however, may in some cases not be carried to the bottom of the cylinder, but only to the point indicated by line $x\ x$ on Fig. 6 or to a point lower than the port $m$ by the thickness of the piston, in which case oil will flow only through the port $m\ m'$ during the second part of the stroke of the piston. This allows the speed of the piston during each part of its stroke to be regulated quite independently of the other.

Obviously other valves than flap-valves and other mechanism for closing them having the same effect as that shown and described may be arranged.

I claim as my invention—

1. The combination with a smoke-consuming apparatus for furnaces admitting air above the grate through channels provided with air-inlets, of valves for said inlets adapted to open self-actingly when released, stops adapted to limit the opening of the valves, a shaft connected to the fire-door by mechanism adapted to turn the shaft in one direction by the opening of the fire-door and release it by the closure of the same, a weight adapted to turn the shaft back into its position of rest after it is released, levers on said shaft adapted to start the closure of the inlet-valves after the said shaft has made part of its return movement and to complete the closure while it makes the remaining part, and a cataract the piston of which is connected to the shaft and adapted to retard its motion.

2. The combination with a smoke-consuming apparatus for furnaces admitting air above the grate through inlets in the deadplate, of flap-valves underneath said inlets adapted to open by their weight, a shaft below said flap-valves, a lever on said shaft connected by a cord to a pulley on the fire-door spindle and adapted to turn the said shaft in one direction when the fire-door is opened; a weight attached to levers fixed on said shaft and adapted to turn the shaft back to its position of rest, wipers on said shaft adapted to close said flap-valves and so set that they start the closure only after said shaft has made part of its return movement, and a cataract adapted to retard the return movement of the shaft.

3. The combination with a smoke-consuming apparatus for furnaces having air-inlets opened by the opening of the fire-door and closed by the descent of a weight previously raised by the opening of the door, of a cataract-cylinder, a piston therein and piston-rod, levers and links connected to the piston-rod and to the fire-door and weight respectively, a valve in the piston adapted to open when the piston is moved by the opening of the fire-door, a port in the cataract-cylinder connecting the two ends thereof, a second port connecting the middle of the cylinder with the end toward which the piston is drawn by the weight and means regulating the flow of liquid through said ports.

4. The combination with a smoke-consuming apparatus for furnaces admitting air above the grate through channels provided with air-inlets, of valves for said inlets adapted to open self-actingly when released, stops adapted to limit the openings of the valves, a shaft carrying levers adapted to hold said valves normally closed, mechanism adapted to turn said shaft by opening the fire-door and to release it when the door is closed, the movement imparted to the shaft being greater than required for said levers to allow the valves to drop upon the stops, a weight connected to the shaft and adapted to turn it back to its position of rest, a cataract the piston of which is connected to the shaft by links and levers and provided with a valve adapted to open fully when the shaft is turned by means of the door, a port connecting the top and bottom of the cataract-cylinder and provided with means for regulating the flow of liquid through said port, a second port connecting the bottom and the middle of the cylinder and likewise provided with means for regulating the flow of liquid through said port.

5. The combination with a smoke-consuming apparatus for furnaces admitting air above the grate through inlets in the dead-plate, of flap-valves for said inlets underneath said dead-plate, a shaft underneath said flap-valves, wipers on said shaft adapted to hold said flap-valves normally closed, a lever on said shaft connected by a cord to a pulley on the fire-door spindle and adapted to turn the shaft in one direction when the fire-door is opened and to release it when the door is closed, the movement imparted to the shaft being greater than required for said wipers to allow the flap-valves to drop open, a weight supported on levers fixed to the shaft in such a position that the weight is raised by the opening of the fire-door, another lever fixed upon the said shaft and connected by links and levers to the piston-rod of a cataract, the piston of which is fitted with a valve and the cylinder of which has two ports, one connecting the top and bottom and another the middle and bottom of the cylinder, and means for regulating the flow of the liquid in the cataract through said ports.

6. The combination with a smoke-consuming apparatus for furnaces admitting air above the grate through inlets in the dead-plate of flap-valves for said inlets hinged underneath the dead-plate, a shaft underneath said inlets, a lever on said shaft connected by a cord to a pulley on the fire-door spindle and adapted to turn the shaft in one direction when the door is opened, wipers on said shaft adapted to hold the flap-valves normally closed and release them when the shaft is turned by the opening of the fire-door, the movements of the wipers being greater than required for allowing the flap-valves to open the inlets, a weight supported on levers fixed to the shaft in such a position that the weight is raised by the opening of the fire-door another lever fixed upon the shaft and connected by a link to one limb of a bell-crank, a cataract with a piston the piston-rod of which is connected by a link to the other limb of the bell-crank, a valve in the piston adapted to open when the piston is moved by the opening of the door to one end of the cataract-cylinder, a port connecting this end of the cylinder with the other end and means for reducing the area of the port, a second port connecting the middle of the cylinder with said other end, and means for reducing the area of this port.

In testimony whereof I have hereunto set my hand in the presence of two witnesses.

WILLIAM CHARLES COURTS.

Witnesses:
CARL BOLLÉ,
ROBERT COLLINGS.